United States Patent [19]

Mirenda et al.

[11] Patent Number: 4,830,249

[45] Date of Patent: May 16, 1989

[54] BOAT CRADLE AND LOADING DEVICE FOR VEHICLE TOPS

[76] Inventors: Paul Mirenda, 2 Fox Trail, Medford, N.J. 08055; Kenneth R. Woolcock, R.D. 1, Fire La. Rd., Vincentown, N.J. 08088

[21] Appl. No.: 202,682

[22] Filed: Jun. 6, 1988

[51] Int. Cl.[4] .............................................. B60R 9/00
[52] U.S. Cl. .................................. 224/310; 224/319; 414/462; 193/42
[58] Field of Search ............... 224/310, 309, 314, 317, 224/319, 320, 321, 322, 323, 325, 326, 327, 329, 330, 331; 414/462; 193/42

[56] References Cited

U.S. PATENT DOCUMENTS

| | | | |
|---|---|---|---|
| 2,613,020 | 10/1952 | Berry | 224/310 |
| 2,667,295 | 1/1954 | Johnston et al. | 414/462 |
| 2,668,646 | 2/1954 | Nielsen | 224/310 |
| 2,859,887 | 11/1958 | Haight | 414/462 |
| 3,077,276 | 2/1963 | Thwreat | 193/42 |
| 3,170,583 | 2/1965 | Meyer | 224/310 |
| 3,312,363 | 4/1967 | Oldham | 414/462 |
| 3,452,893 | 7/1969 | Heflin | 414/462 |
| 3,830,389 | 8/1974 | Van Acker | 414/462 |
| 3,837,514 | 9/1974 | Barnes | 414/462 |
| 4,063,659 | 12/1977 | Welch | 414/462 |
| 4,085,859 | 4/1978 | Petron | 414/462 |
| 4,446,998 | 5/1984 | Taig | 224/329 |

FOREIGN PATENT DOCUMENTS

| | | |
|---|---|---|
| 455462 | 3/1949 | Canada . |
| 729469 | 3/1966 | Canada . |
| 3318891 | 11/1984 | Fed. Rep. of Germany . |

Primary Examiner—Henry J. Recla
Assistant Examiner—J. Casimer Jacyna
Attorney, Agent, or Firm—Thomas A. Lennox

[57] ABSTRACT

A boat cradle and loading device attached directly to a roof carrier with two laterally positioned parallel horizontal support members the device including two parallel side members aligned along the sides of the vehicle top, to each of which are attached right triangle support boat members which are positioned to form a "V" shaped cradle, one to the front and one to the back for the hull of the boat to rest and the keel of the boat to rest directly on at least one of the horizontal carrier support members with a roller intermediately disposed on the top of one side member positioned such that the keel of the boat may ride on the roller to allow the boat to be pushed onto the top of the cradle device while pushing on the rear of the boat with the keel riding on the roller until the boat center of gravity passes the roller at which time the boat end can be swung around and the boat drops in to the cradle.

23 Claims, 3 Drawing Sheets

BOAT CRADLE AND LOADING DEVICE FOR VEHICLE TOPS

BACKGROUND OF THE INVENTION

This invention involves a boat cradle and loading device attached to vehicle tops. Specifically, the invention is directed to a device which holds a small boat on the top of a car top and is structured to allow the boat to be placed in the cradle and removed from the cradle by a single person.

Roof carriers have long been the standard device for attaching and carrying goods on the top of vehicles. Recreational equipment and specifically small boats, such as small sail boats are popularly taken on vacations and trips, sometimes with great difficulty. One option is to attach a trailer to the back of the vehicle and carry the boat in that fashion. Unfortunately, this reduces the speed of travel and is difficult to handle, particularly for backing up by a novice. On the other hand, the common roof carrier is not a satisfactory device to attach a small boat to the top of the vehicle. The top of the boat is not flat and is further not constructed to hold and support the entire boat weight. Despite attempts to reduce the stress on the glass fiber structure, it is common to damage the boat in transit. Further, one of the advantages of these small boats is that they can be used by a single person, even in a remote area. Unfortunately, with the typical roof carrier, it is necessary to use two or three people to remove the boat from the carrier without damaging the boat or the single person trying to remove the boat. The small boats are generally constructed of glass fiber reinforced resin in order to achieve the light weight and style desired. While this structure is very satisfactory for the boat once it is in the water, impact with a sharp corner will relatively easily break the structure requiring the hole to be repaired before use. Further, the structure of these boats is designed to have the load bearing surface be the bottom of the boat and specifically the beam of the boat, which is typically glass fiber covered metal reinforcement. Thus to try to load and travel with a boat attached upside down to a roof carrier is not a satisfactory procedure.

While there are number of boat carriers, none address the needs described above and none attain the objects listed herein below.

SUMMARY OF THE INVENTION

An object of the present invention is to provide a device which cradles and supports a small boat on a roof top carrier of a vehicle.

It is a specific object of the present invention to provide a vehicle top cradle and boat loading device which attaches to a roof carrier attached to th vehicle top, the roof carrier including two parallel horizontal carrier support members with their legs transverse to a front to rear direction of the vehicle top and supported above the vehicle top with one support member positioned toward the front of the vehicle top and the other support member positioned toward the rear of the vehicle.

A further object of the present invention is to provide a car top cradle which allows the bottom of the boat to rest on angled support members such that the stress on the bottom of the boat is spread out over a substantial area of the boat bottom.

It is an additional object of the present invention to provide a vehicle top cradle device for supporting small boats wherein the bottom of the boat rests on a cradle attached directly on a roof carrier.

It is a particular object of the present invention to provide a loading device which allows a single person handling the boat to load the boat, right side up onto the cradle carrier and also remove the boat from the cradle carrier in an upright position for use.

It is a particular object of the present invention to provide a loading device including a roller which allows the boat to be pushed onto the top of the cradle with the keel riding on the roller and further to have the roller be positioned such that there is no contact between the roller and the bottom of the boat, including the keel, when the boat is in the cradle.

It is a specific object of the present invention to provide a contoured underbody support to support the boat body in a stable position.

The invention is a vehicle top cradle and boat loading device for a boat having a hull and a beam. The device is used on the vehicle top having front, rear, and two sides equipped with a roof carrier including two parallel horizontal carrier support members with their lengths transverse to a front to rear direction and supported above the vehicle top, one support member proximate the front and the other proximate the rear of the top. The device includes two parallel side members aligned lengthwise front to rear on opposite sides of the vehicle top and a front pair and a rear pair of boat support members. Each support member includes generally right triangular shaped member with one right side abutting a side member and the other right side abutting a top of a carrier support member, and a hull resting surface of the angled hypotenuse side of the boat support member facing upwardly of a composition to resist marring the boat hull bottom. The boat support members are positioned to form two "V" shaped cradles and are of sufficient size and shape to allow the boat hull to rest securely on the combined hull resting surfaces of both pairs of the boat support members. A side attachment means is included to adjustably attach the support members to the side members to align the support members to rest on the top of the horizontal carrier members. Also included is a carrier attachment means to attach the device to the horizontal carrier members. A horizontal free rolling roller is disposed intermediate along a top edge of a side member, the roller being of sufficient size and shape to receive the beam of the boat allowing the boat to be pushed up onto the top of the device riding the beam on the roller. It is preferred that the roller be recessed below the top edge of the side member to avoid contact of the roller with hull when the boat is resting in the cradle.

The invention also includes a method of loading a boat, having a hull and a beam, onto a vehicle top having a front, rear, and two sides. The vehicle is equipped with a roof carrier including two parallel horizontal carrier support members with their lengths transverse to a front and the other proximate the rear of the top. The method includes positioning two parallel side members aligned lengthwise front to rear on opposite sides of the vehicle top, at least one of the side members having a horizontal free rolling roller disposed intermediate along a top edge of the side member, the roller being of sufficient size and shape to receive the beam of the boat allowing the boat to be pushed up onto the top of the device riding the beam on the roller. The method further includes positioning a front pair and a rear pair of boat support members, each support member including a generally right triangular shaped member with one right side abutting a side member and the other right side abutting a top of a carrier support member, and a hull resting surface of the angled side of the boat support members facing upwardly of a composition to resist marring the boat hull bottom. The method includes positioning the boat support members to form a "V" shaped cradle, they being of sufficient size and shape to allow the boat hull to rest securely on the combined hull resting surfaces of both pairs of the boat support members.

The method further includes attaching the support members to the side members and attaching the device to the horizontal carrier members. The method further includes engaging the boat beam onto the roller and pushing the boat upwardly until the center of gravity of the boat is past the roller. The method finally includes swinging the boat around sliding the hull on the top of the side members to bring its length to align front to rear, and allowing the boat to slide into the cradle formed by the boat support members.

DESCRIPTION OF PREFERRED EMBODIMENTS

Figure 1:
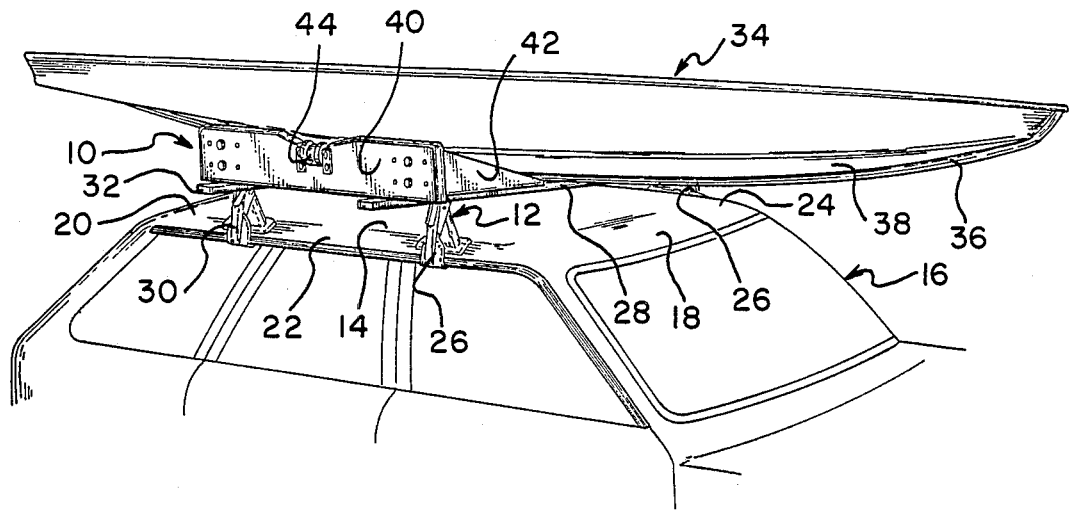
FIG. 1 is a perspective view of a cradle and boat loading device of the present invention attached to a roof carrier on the top of a vehicle with a boat resting in the cradle.

In FIG. 1, cradle and boat loading device 10 is shown attached to roof carrier 12 which is in turn detachably attached to roof 14 of vehicle 16. Top 14 includes front section 18, rear section 20, right side 22 and left side 24. Roof carrier front attachment bracket devices 26 connect proximate sides 22 and 24 of top 14 and structurally support front horizontal carrier support member 28. Rear roof carrier attachment bracket device 30 attach close to rear 20 and support rear horizontal carrier support 32. Boat 34 has bottom 36 resting on device 10 attached to horizontal carrier supports 28 and 32. Right side member 40 of device 10 rests on carrier supports 28 and 32 proximate side 22 spanning the distance between them and providing structural support. Right front boat support member 42 forms part of the cradle on which boat bottom 36 rests. Roller 44 disposed intermediate along a top edge of right side member 40 receives keel 38 in the loading and unloading process to be described hereinbelow.

Figure 2:
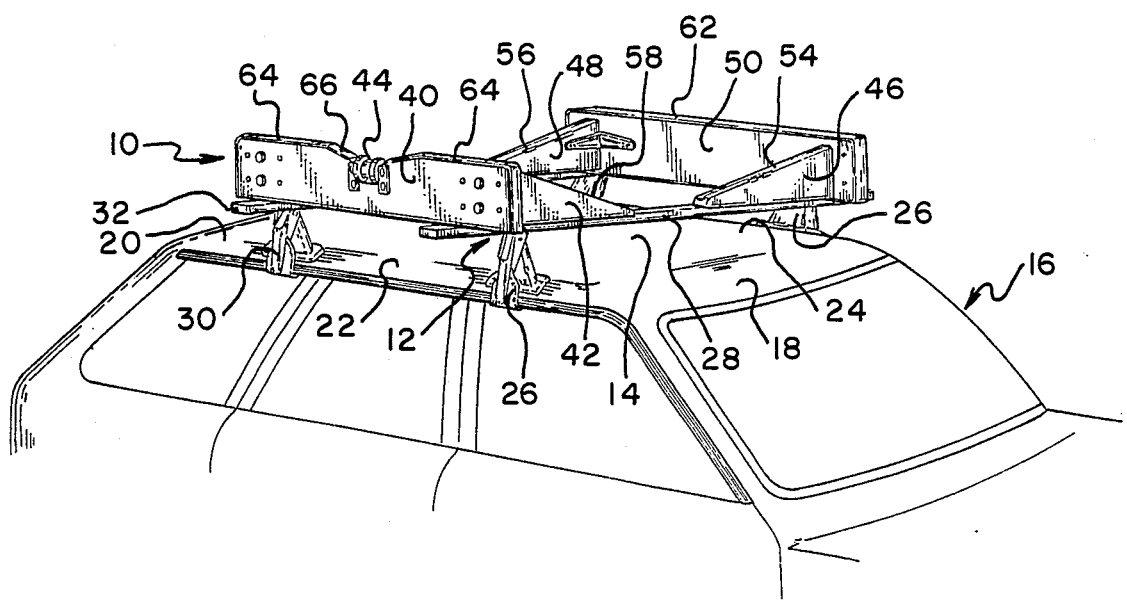
FIG. 2 is a slightly enlarged perspective view of the cradle and boat loading device illustrated in FIG. 1 with the boat removed.

In FIG. 2, with boat 34 removed, left front boat support member 46 and left rear boat support member 48 are shown attached to left side member 50. Boat support members 42, 46, 48 and right rear boat support member 52 (hidden in this view) combine to form a cradle on which boat bottom 36 rests. Members 42 and 46 combine to form a front "V" shaped cradle with top surfaces 54 and 58 supporting boat bottom 36. Left rear boat support member 48 and right rear boat support member 52 (hidden in this view) form a rear "V" shaped cradle section with top surface 56 of member 48 and top surface 60 (hidden in this view) of member 52 supporting boat bottom 36. Tops 62 and 64 of left side member 50 and right side member 40 respectively are fitted with a slidable relatively nonmarring surfaces in case they abut the bottom or sides of boat 34. Surfaces 54, 56, 58 and 60 are all composed of relatively soft nonmarring material such as nylon carpeting, as boat bottom 36 is cradled on those surfaces. Typical compositions include carpeting material, foam rubber, polyolefin plastic, and like materials. Recess 66 is cut out of top 64 to allow roller 44 to be positioned below the upper most edge of top 64 and is further angled so that keel 38 rolls on roller 44 without undue contact with top 64 as boat 34 is pushed onto the top of carrier device 10 or is pulled off of the device with the keel riding in roller 44. Further, recess 66 lowers roller 44 in a position so that it does not contact bottom 36 when boat 34 is resting in the cradled position. Top 62 and in particular top 64 is constructed of a polymeric plastic to facilitate sliding of the boat hull on that surface during the loading and unloading process. Polyolefin plastics are preferred.

Figure 3:
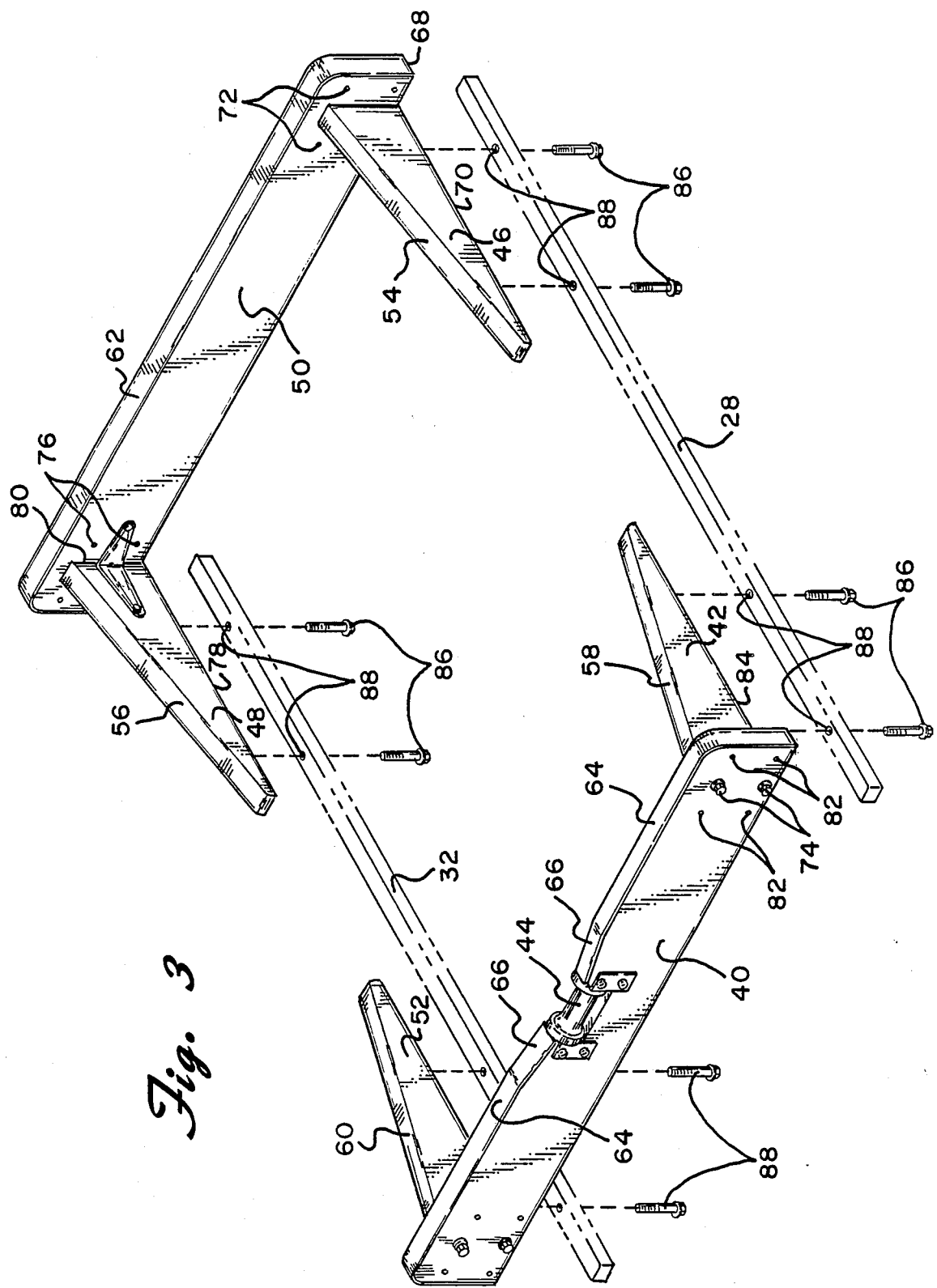
FIG. 3 is a perspective view of the cradle and boat loading device illustrated in FIG. 2.

FIG. 3 illustrates device 12 in greater detail and illustrates how the device is attached to horizontal carrier support members 28 and 32. Each of the boat support members, 42, 46, 48 and 52 are in the general shape of right triangles positioned so that tops 54, 56, 58 and 60 are the diagonal sides of those triangles positioned to slope downwardly toward the center of the vehicle top. It should be understood that these diagonal sides need not be straight lines and may be formed in a convex or concave shape to custom fit to the boat hull bottom of choice. For most boat bottoms, top surfaces 54 through 60 may be straight and still provide substantial contact area with the boat bottom to adequately distribute the stresses. For left front boat support member 46, bottom edge 70 is the longer leg of the right sided triangle extending along and abutting the top of front carrier support 28. In this embodiment, bottom edge 70 is about four times the length of edge 68 which is positioned vertically and comprises the other side of the right triangle. Side 68 abuts the inside surface of left side member 50 and is attached by bolts 74 through holes 72. Holes 72 are positioned to provide multiple choices as to the spacing between boat support members on a single side member. Optional hole pairs are spaced along the longitudinal length of side member 50 proximate the front end. Likewise, holes 76 are spaced longitudinally along side member 50 proximate the rear end. This allows left boat support members 46 and 48 to be spaced closer together or further apart depending upon the length of car top 14. Device 12 is connected together through lag bolts 74 which threadably engage into the opposing surface to be attached. This general mechanism is also used to attach device 10 to the horizontal carrier support members. Metal "L" shaped angle supports 78 are used to rigidify the connection between boat support members and their respective side member. Similar to boat support member 46, upper edge 56 is the hypotenuse diagonal of the right triangular shape with long right angle edge 78 attaching directly to the rear horizontal carrier support 32. Short right angle edge 80 is attached to the inside face in vertical alignment to left side member 50. The right portion of device 10 is constructed similarly wherein right front boat support member 42 is attached toward the front of right side member 40 through holes 82 through which lag bolts 74 insert to engage in a short vertical right angle edge of support member 42. Lower edge 84 of right front boat support member 42 abuts and is attached to the top of right horizontal carrier support member 28 through bolts 86 through vertical holes 88 through member 28. Since roof carrier 12 horizontal support members may be attached at any position along the edges of car top 14, the spacing between boat support members is chosen with regard to the car top size. Device 10 is attached to the car top roof carrier 12 and the combined apparatus detachably attached to the car top edges 22 and 24. Right rear boat support member 52, although partially hidden in this view, is the mirror image of left rear boat support member 48 and combines to form the rear "V" shaped cradle for boat bottom 38.

Figure 4:
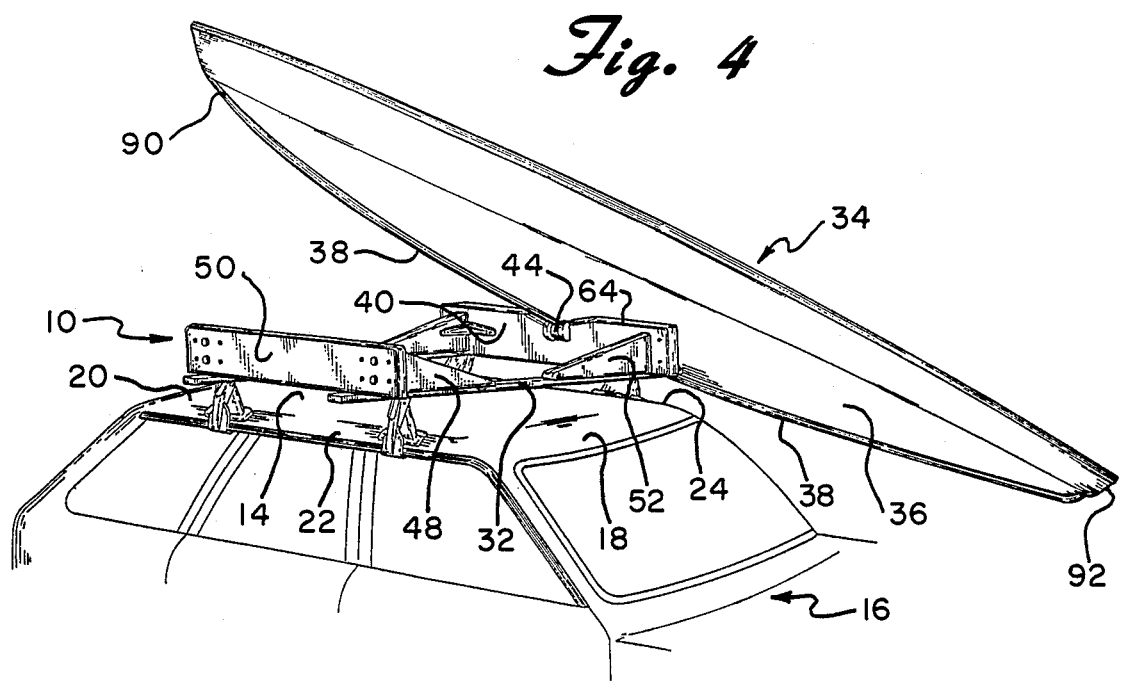
FIG. 4 is a perspective view illustrating the cradle and boat loading device illustrated in FIG. 2 of the top of a car with a boat in the position of being loaded onto the cradle.

In FIG. 4, boat cradle and loading device 10 has been rotated around on car top 14 so that the rear most portion of the combination of device 10 and roof carrier 12 is now the front most portion of the combination. In this attachment, horizontal carrier support 32 is now positioned frontwardly as are the parts of device 10 attached to it. FIG. 4 illustrates the method of a single person loading boat 34 onto cradle device 10. The front end of boat 34 is lifted and front end 90 of keel 38 is engaged to run on roller 44. Rear end 92 of boat 34 is lifted while maintaining engagement of keel 38 on roller 44. Boat 34 is pushed upwardly while keel 38 continues to ride on roller 44 without the necessity of boat bottom 36 having to contact top 64 of right side member 40. When the center of gravity of boat 34 has passed roller 44, it is an easy matter to swing rear end 92 around allowing boat 34 to slide into cradle 10 so that boat bottom 36 rests on the surfaces created by the combination of boat support members 54 through 60.

Figure 5:
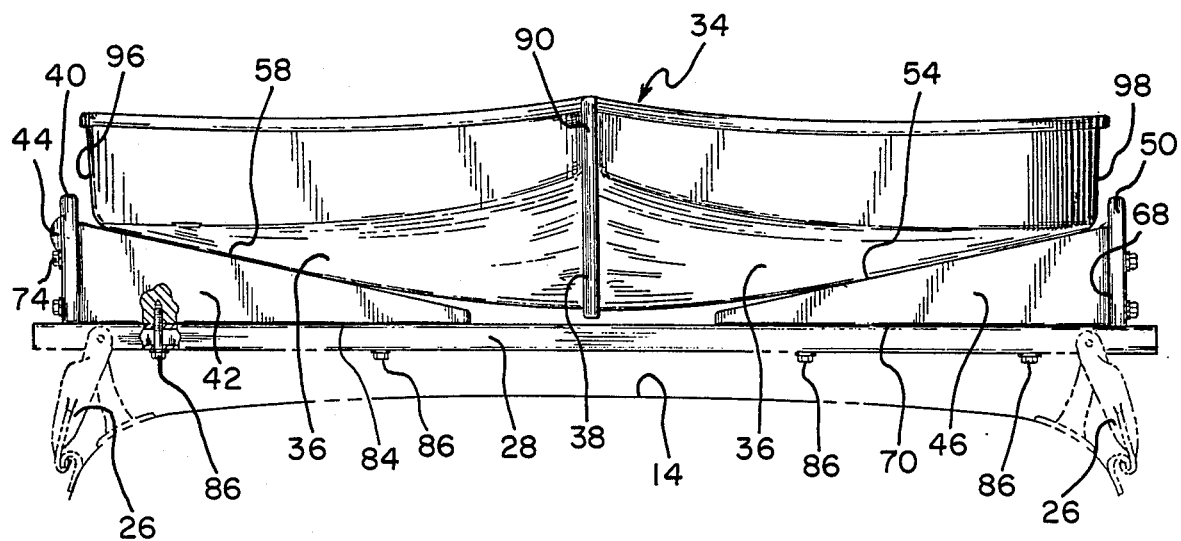
FIG. 5 is a partial frontal view of the device, boat and roof carrier illustrated in FIG. 1.

FIG. 5, which is a front view of the boat in position on top of cradle and boat loading device 10 as pictured in FIG. 1, it is illustrated how right front boat support member is attached through bolts 86 as are the other boat support members. Also, most importantly, it is shown how boat bottom 36 rests on upper surfaces 54 (and similarly on the rear cradle formed by upper surfaces 56 and 60) to securely hold the boat in place. Keel 38 may rest directly on either front horizontal carrier support 28 or rear support 32 or both. FIG. 5 also illustrates that holes 88 may be positioned such that bolts 86 attach the lateral position of boat support members 42, 46, 48 and 52 a sufficient distance apart so that boat sides 96 and 98 do not rest against the inside surfaces of right side member 40 and left side member 50 respectively when the boat support members are positioned laterally closer together the boat hull is raised upwardly slightly. When the boat support members are positioned laterally further apart the boat hull is lowered until the keel rests on one or both of the horizontal carrier supports.

While this invention has been described with reference to the specific embodiments disclosed herein, it is not confined to the details set forth and the patent is intended to include modifications and changes which may come within and extend from the following claims.

We claim:

1. A vehicle top cradle and boat loading device for a boat having a hull and a keel, the device being for use on the vehicle top having a front, rear, and two sides equipped with a roof carrier comprising two parallel horizontal carrier support members with their lengths transverse to a front to rear direction and supported above to vehicle top, one support member proximate the front and the other proximate the rear of the top, the device comprising:
    (a) two parallel side members aligned lengthwise front to rear on opposite sides of the vehicle top,
    (b) a front pair and a rear pair of boat support members, each support member comprising:
        (i) a generally right triangular shaped member with one right side abutting a side member and the other right side abutting a top of a carrier support member, and
        (ii) a hull resting surface of the hypotenuse side of the boat support member facing upwardly of a composition to resist marring the boat hull bottom,
    wherein the boat support members are positioned to form a "V" shaped cradle and are of sufficient size and shape to allow the boat hull to rest securely on the combined hull resting surfaces of both pairs of the boat support members,
    (c) side attachment means to adjustably attach the support members to the side members to align the support members to rest on the top of the horizontal carrier members,
    (d) carrier attachment means to attach the device to the horizontal carrier members, and
    (e) a horizontal free rolling roller means disposed intermediate along a top edge of a side member, the roller means being of sufficient size and shape to receive the keel of the boat allowing the boat to be pushed up onto the top of the device riding the beam on the roller means.

2. The device of claim 1 wherein the roller means is recessed below the top edge of the side member to avoid contact of the roller means with hull when the boat is resting in the cradle.

3. The device of claim 2 wherein the roller means recess is a "V" shaped cut out of sufficient size and shape to cause the keel to slide into and to maintain contact wile the boat is pushed onto the device.

4. The device of claim 1 wherein the carrier attachment means attaches the boat support members to the horizontal carrier members.

5. The device of claim 1 wherein the roller means comprises a free spinning roller.

6. The device of claim 1 wherein a top edge surface of the parallel side members has a slippery surface.

7. The device of claim 1 wherein the hull resting surface of the boat support members is a soft compressible surface.

8. The device of claim 7 wherein the hull resting surface of the boat support members is pile carpet.

9. The device of claim 1 wherein the hull resting surface of the boat support members is an angled flat surface.

10. A method of loading a boat, having a hull and a keel, onto a vehicle top having a front, rear, and two sides equipped with a roof carrier comprising two parallel horizontal carrier support members with their lengths transverse to a front to rear direction and supported above to vehicle top, one support member proximate the front and the other proximate the rear of the top, the method comprising:
    (a) positioning two parallel side members aligned lengthwise front to rear on opposite sides of the vehicle top, at least one of the side members having horizontal free rolling roller means disposed intermediate along a top edge of the side member, the roller means being of sufficient size and shape to receive the keel of the boat allowing the boat to be pushed up onto the top of the device riding the keel on the roller means, (b) positioning a front pair and rear pair of boat support members, each support member comprising:
(i) a generally right triangular shaped member with one right side abutting a side member and the other right side abutting a top of a carrier support member, and
(ii) a hull resting surface of the angled side of the boat support member facing upwardly of a composition to resist marring the boat hull bottom, wherein the boat support members are positioned to form a "V" shaped cradle and are of sufficient size and shape to allow the boat hull to rest securely on the combined hull resting surfaces of both pairs of the boat support members and also for the keel to rest on at least one of the carrier support members, (c) attaching the support members to the side members to align the support members to rest on the top of the horizontal carrier members, (d) attaching the support members to the horizontal carrier members, (e) engaging the boat keel onto the roller means and pushing the boat upwardly until the center of gravity of the boat is past the roller means, (f) swinging the boat around to bring its length to align front to rear, and (g) allowing the boat to slide into the cradle formed by the boat support members.

11. The method of claim 10 further comprising recessing the roller means below the top edge of the side member to avoid contact of the roller means with hull when the boat is resting in the cradle.

12. The method of claim 11 wherein the recessing is cutting a "V" shaped cut out of sufficient size and shape to cause the keel to slide into and to maintain contact while the boat is pushed onto the device.

13. The method of claim 11 wherein the roller means comprises a free spinning roller.

14. The method of claim 11 wherein a top edge surface of the parallel side members has a slippery surface.

15. A vehicle top cradle and boat loading device for a boat having a hull and a keel, the device being for use on the vehicle top having a front, rear, and two sides, the device comprising:
(a) a roof carrier comprising two parallel horizontal carrier support members with their lengths transverse to a front to rear direction and supported above to vehicle top, one support member proximate the front and the other proximate the rear of the top,
(b) two parallel side members aligned lengthwise front to rear on opposite sides of the vehicle top,
(c) a front pair and a rear pair of boat support members, each support member comprising:
(i) a generally right triangular shaped member with one right side abutting a side member and the other right side abutting a top of a carrier support member, and
(ii) a hull resting surface of the hypotenuse side of the boat support member facing upwardly of a compsition to resist marring the boat hull bottom, wherein the boat support members are positioned to form a "V" shaped cradle and are of sufficient size and shape to allow the boat hull to rest securely on the combined hull resting surfaces of both pairs of the boat support members, (d) side attachment means to adjustably attach the support members to the side members to align the support members to rest on the top of the horizontal carrier members, (e) carrier attachment means to attach the device to the horizontal carrier members, and (f) a horizontal free rolling roller means disposed intermediate along a top edge of a side member, the roller means being of sufficient size and shape to receive the keel of the boat allowing the boat to be pushed up onto the top of the device riding the beam on the roller means.

16. The device of claim 15 wherein the roller means is recessed below the top edge of the side member to avoid contact of the roller means with hull when the boat is resting in the cradle.

17. The device of claim 16 wherein the roller means recess is a "V" shaped cut out of sufficient size and shape to cause the keel to slide into and to maintain contact while the boat is pushed onto the device.

18. The device of claim 15 wherein the carrier attachment means attaches the boat support members to the horizontal carrier members.

19. The device of claim 15 wherein the roller means comprises a free spinning roller.

20. The device of claim 15 wherein a top edge surface of the parallel side members has a slippery surface.

21. The device of claim 15 wherein the hull resting surface of the boat support members is a soft compressible surface.

22. The device of claim 21 wherein the hull resting surface of the boat support members is pile carpet.

23. The devcie of claim 15 wherein the hull resting surface of the boat support members is an angled flat surface.

* * * * *